United States Patent
Gibb et al.

(10) Patent No.: US 7,591,055 B2
(45) Date of Patent: Sep. 22, 2009

(54) METHOD OF SECURING FACING END PORTIONS OF PIPE ELEMENTS

(75) Inventors: John Gibb, Beeton (CA); Douglas R. Dole, Whitehouse Station, NJ (US); Michael S. Pigott, Bluffton, SC (US)

(73) Assignee: Victaulic Company, Easton, PA (US)

( * ) Notice: Subject to any disclaimer, the term of this patent is extended or adjusted under 35 U.S.C. 154(b) by 201 days.

(21) Appl. No.: 11/125,739

(22) Filed: May 10, 2005

(65) Prior Publication Data

US 2005/0253382 A1 Nov. 17, 2005

Related U.S. Application Data

(60) Provisional application No. 60/571,596, filed on May 14, 2004.

(51) Int. Cl.
*B21D 39/04* (2006.01)
*F16L 33/16* (2006.01)

(52) U.S. Cl. .................. 29/282; 285/112; 285/367; 285/373

(58) Field of Classification Search .......... 285/112, 285/373, 419, 368, 367, 328, 406; 411/544, 411/546, 547; 29/282, 451
See application file for complete search history.

(56) References Cited

U.S. PATENT DOCUMENTS

| | | | |
|---|---|---|---|
| 29,731 A | 8/1860 | Truss | |
| 1,093,868 A | 4/1914 | Leighty | |
| 2,020,156 A | 11/1935 | Muchnic | |
| 2,377,510 A * | 6/1945 | Newell | 285/112 |
| 2,473,102 A * | 6/1949 | Krooss | 285/112 |
| 3,181,896 A | 5/1965 | Russell | |
| 3,351,352 A * | 11/1967 | Blakeley et al. | 277/615 |
| 3,695,638 A | 10/1972 | Blakeley | |
| 3,797,078 A | 3/1974 | LaPointe | |
| 3,977,705 A | 8/1976 | Thiessen et al. | |
| 4,403,378 A | 9/1983 | Engman | |
| 4,471,979 A | 9/1984 | Gibb et al. | |
| 4,506,418 A | 3/1985 | Viola et al. | |
| 4,522,434 A | 6/1985 | Webb | |
| 4,601,495 A | 7/1986 | Webb | |
| 4,611,839 A * | 9/1986 | Rung et al. | 285/367 |
| 4,722,561 A | 2/1988 | Heckethorn et al. | |
| 4,861,075 A | 8/1989 | Pepi et al. | |
| 5,018,548 A * | 5/1991 | McLennan | 137/315.23 |
| 5,058,931 A | 10/1991 | Bowsher | |
| 5,280,970 A | 1/1994 | Straub | |
| 5,758,907 A * | 6/1998 | Dole et al. | 285/112 |

(Continued)

*Primary Examiner*—James M Hewitt
*Assistant Examiner*—Jay R Ripley
(74) *Attorney, Agent, or Firm*—Ballard Spahr Andrews and Ingersoll, LLP

(57) ABSTRACT

A preassembled mechanical pipe coupling for joining pipe elements in end-to-end relationship is disclosed. The coupling is formed from a plurality of interconnectable segments that are initially maintained in spaced apart relation. The segments have arcuate surfaces that project inwardly. Connection members in the form of lugs and fasteners are mounted on the segments. The connection members are adjustably tightenable for drawing the coupling segments together and forcing the arcuate surfaces into engagement with the outer surfaces of the pipe elements. Notches are formed at ends of the arcuate surfaces to provide clearance allowing the pipe elements to be inserted between the segments when they are in the pre-assembled, spaced apart configuration.

2 Claims, 6 Drawing Sheets

U.S. PATENT DOCUMENTS

| | | |
|---|---|---|
| 6,076,861 A | 6/2000 | Ikeda |
| 6,302,450 B1 | 10/2001 | Dole et al. |
| 6,312,025 B1 * | 11/2001 | Wolfsdorf ................... 285/369 |
| 6,328,352 B1 * | 12/2001 | Geppert et al. .............. 285/373 |
| 6,626,466 B1 * | 9/2003 | Dole .......................... 285/112 |
| 6,908,123 B2 * | 6/2005 | Le .............................. 285/402 |
| 2003/0178850 A1 * | 9/2003 | Dole et al. .................. 285/420 |

* cited by examiner

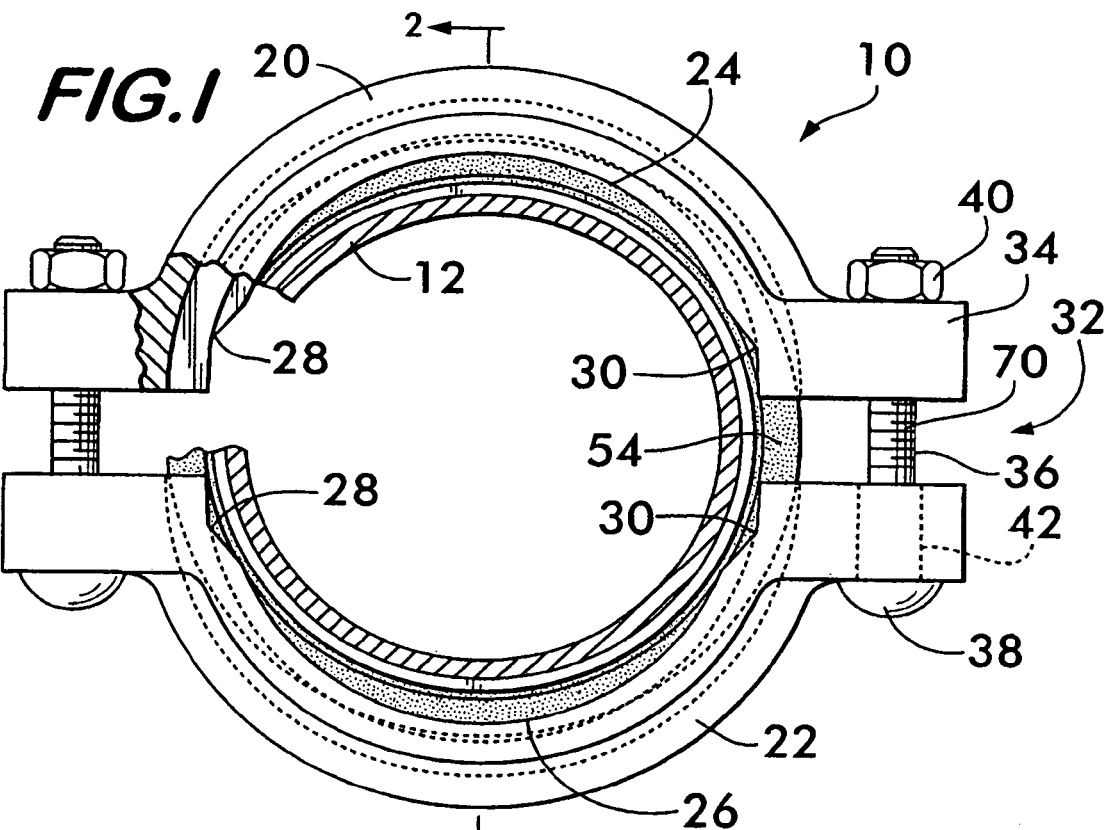
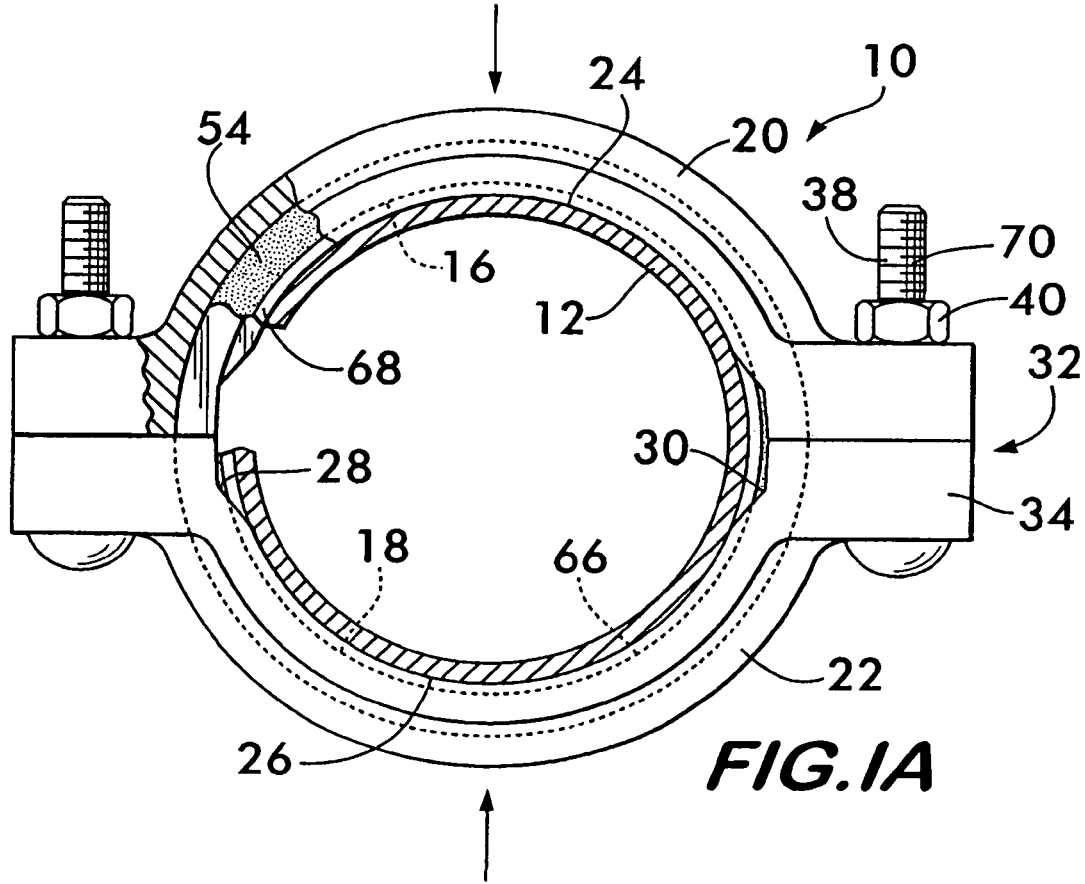

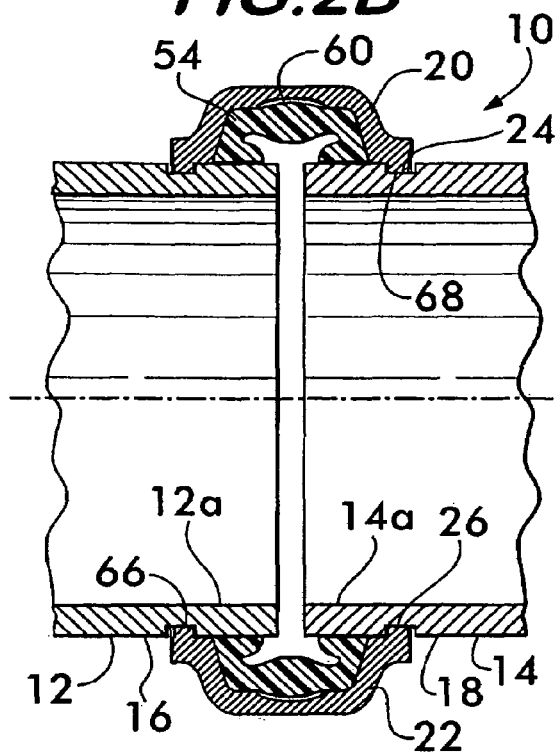
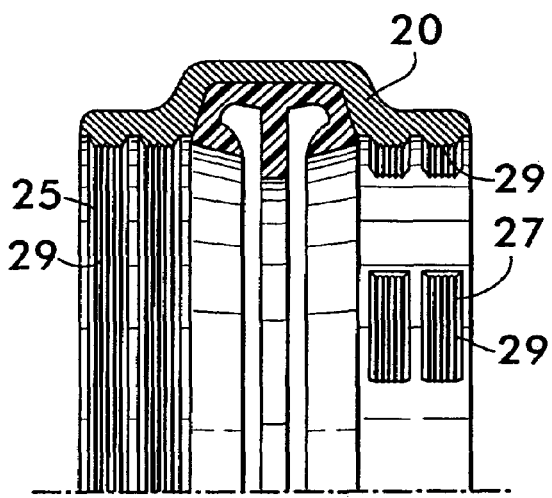
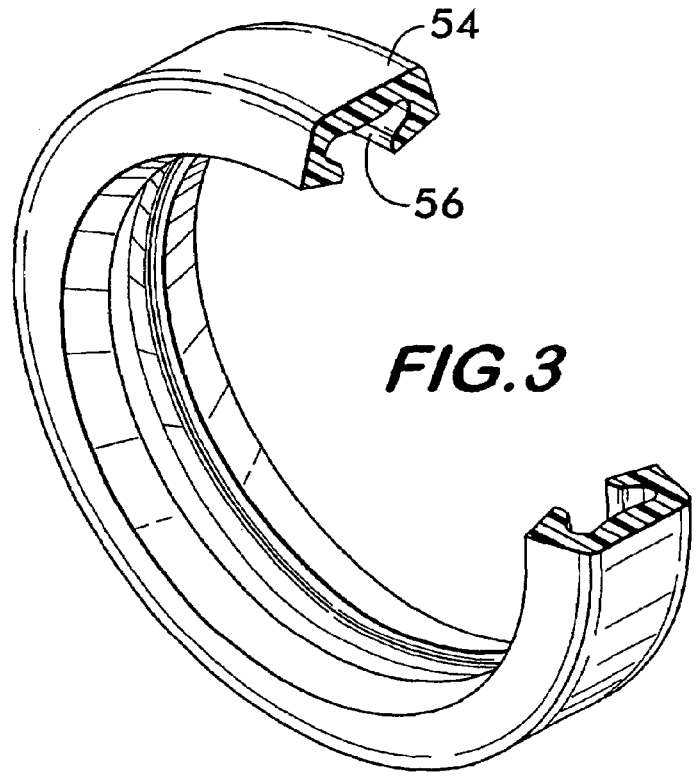

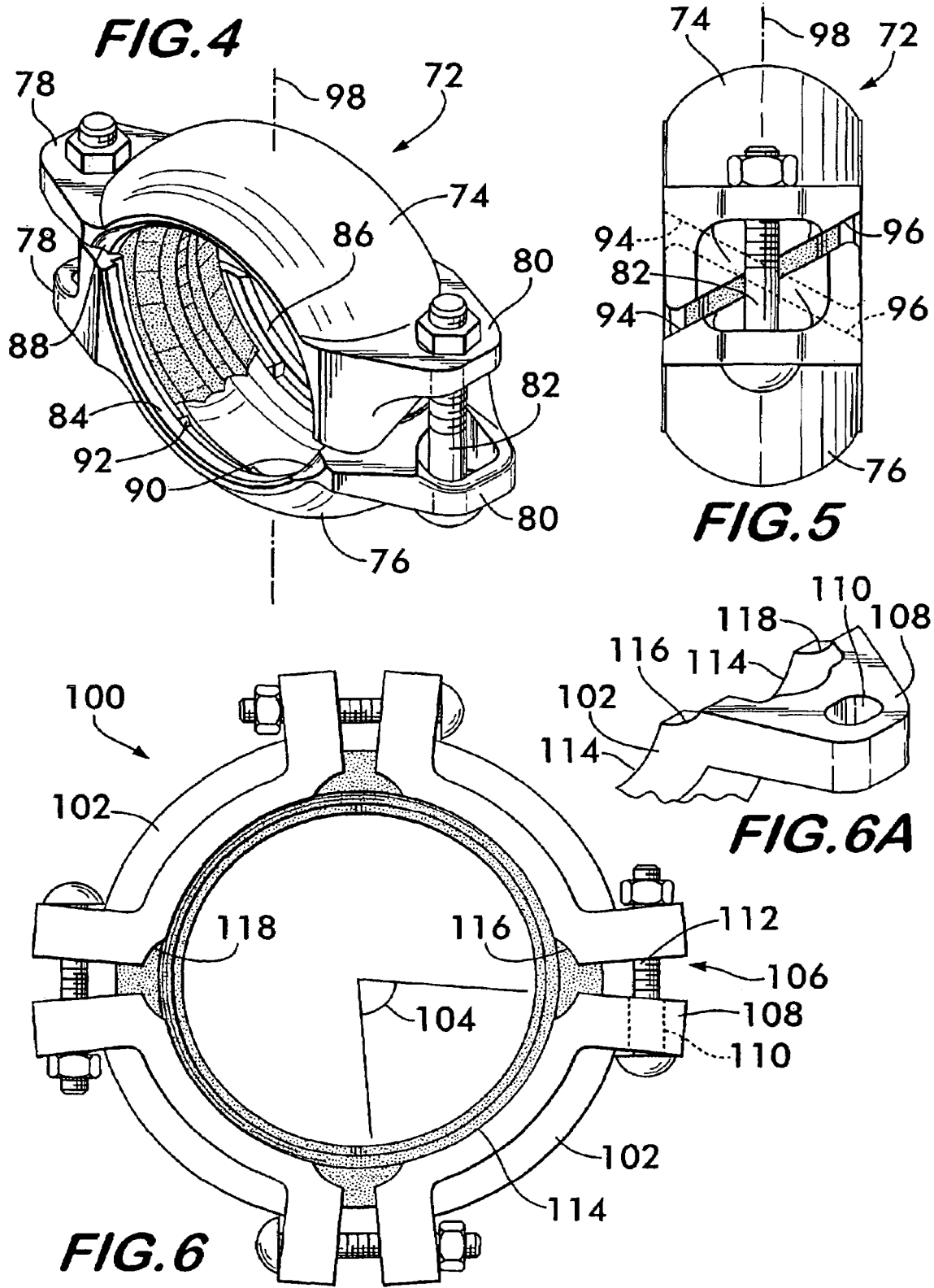

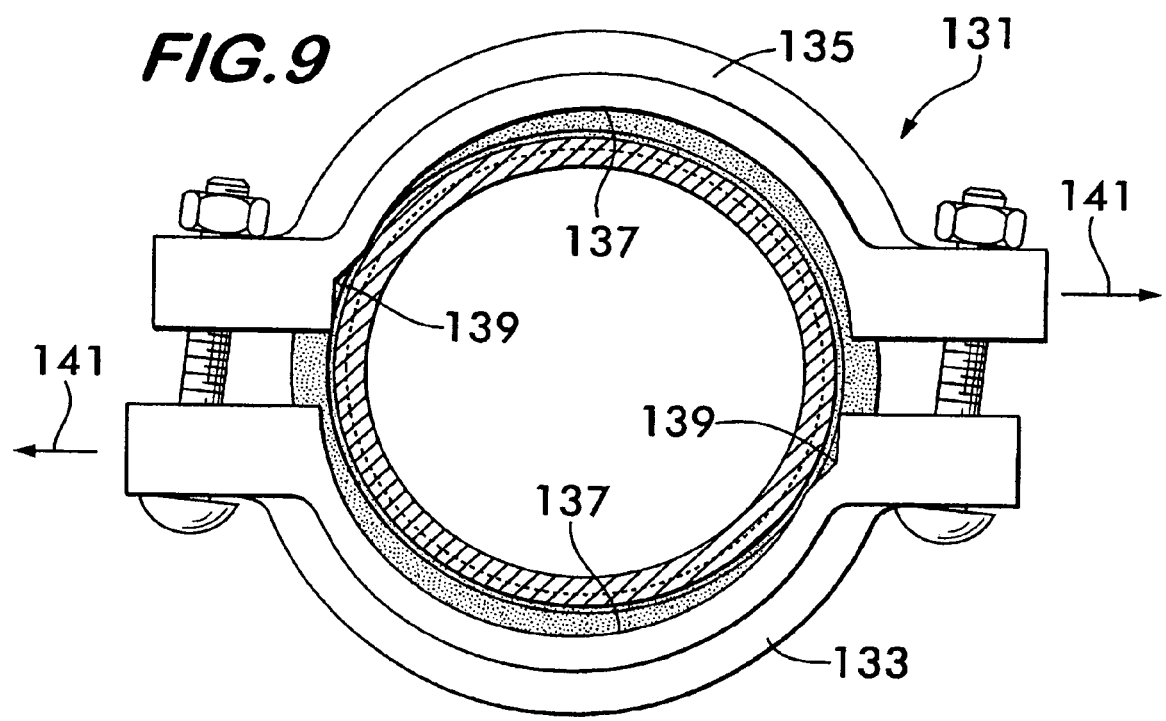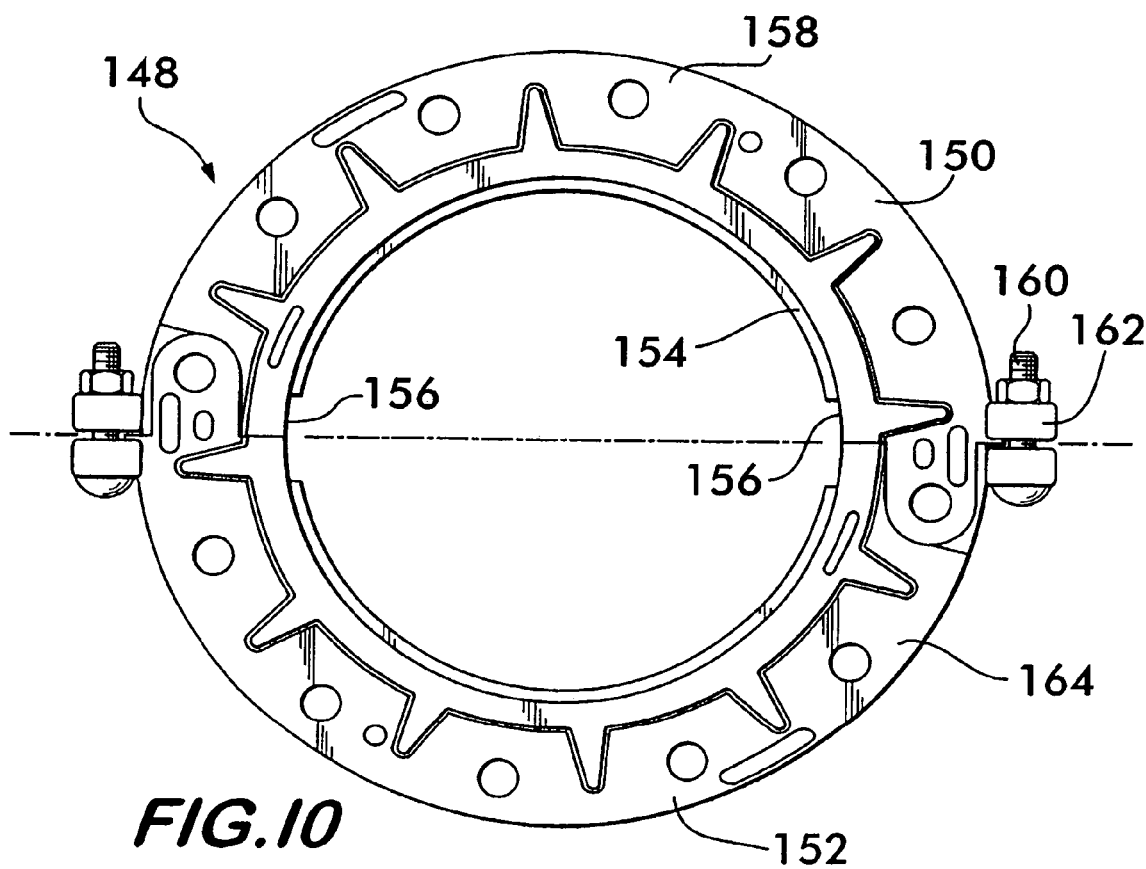

US 7,591,055 B2

METHOD OF SECURING FACING END PORTIONS OF PIPE ELEMENTS

CROSS-REFERENCE TO RELATED APPLICATION

This application is based on and claims priority to U.S. Provisional Application No. 60/571,596, filed May 14, 2004.

FIELD OF THE INVENTION

The invention concerns mechanical pipe couplings for joining pipe elements together in end-to-end relation, the pipe couplings having pipe clearance notches for facilitating installation without the need for prior disassembly of the coupling.

BACKGROUND OF THE INVENTION

Mechanical couplings for joining pipe elements together end-to-end comprise interconnectable segments that are positionable circumferentially surrounding the end portions of co-axially aligned pipe elements. The term "pipe element" is used herein to describe any pipe-like item or component having a pipe like form. Pipe elements include pipe stock, pipe fittings such as elbows, caps and tees as well as fluid control components such as valves, reducers, strainers, restrictors, pressure regulators and the like.

Each mechanical coupling segment comprises a housing having arcuate surfaces which project radially inwardly from the housing and engage plain end pipe elements or circumferential grooves that extend around each of the pipe elements to be joined. Engagement between the arcuate surfaces and the pipe elements provides mechanical restraint to the joint and ensures that the pipe elements remain coupled even under high internal pressure and external forces. The housings define an annular channel that receives a gasket or seal, typically an elastomeric ring which engages the ends of each pipe element and cooperates with the segments to provide a fluid tight seal. The segments have connection members, typically in the form of lugs which project outwardly from the housings. The lugs are adapted to receive fasteners, such as nuts and bolts, which are adjustably tightenable to draw the segments toward one another.

To ensure a good fit between the couplings and the pipe elements, the arcuate surfaces on prior art couplings have a radius of curvature that is substantially matched to the radius of curvature of the outer surface of the pipe element that it is intended to engage. For couplings used with grooved pipe elements, the radii of curvature of the arcuate surfaces are smaller than the radii of curvature of the outer surfaces of the pipe elements outside of the grooves so that the arcuate surfaces fit within and engage the grooves properly.

This geometrical relation between the arcuate surfaces of the couplings and the outer surfaces of the pipe elements in prior art couplings results in a tedious and time consuming installation process when mechanical couplings are used. Typically, the coupling is received by the technician with the segments bolted together and the ring seal captured within the segments' channels. The technician first disassembles the coupling by unbolting it, removes the ring seal, lubricates it (if not pre-lubricated) and places it around the ends of the pipe elements to be joined. Installation of the ring seal requires that it be lubricated and stretched to accommodate the pipe elements, an often difficult and messy task, as the ring seal is usually stiff and the lubrication makes manual manipulation of the seal difficult. With the ring seal in place on both pipe elements, the segments are then placed one at a time straddling the ends of the pipe elements and capturing the ring seal against them. During placement, the segments engage the seal, the arcuate surfaces are aligned with the grooves when present, or with alignment marks made on the outside surfaces of the pipe elements, the bolts are inserted through the lugs, the nuts are threaded onto the bolts and tightened, drawing the coupling segments toward one another, compressing the seal and engaging the arcuate surface within the grooves.

As evident from the previous description, installation of mechanical pipe couplings according to the prior art requires that the technician typically handle at least seven individual piece parts (and more when the coupling has more than two segments), and must totally disassemble and reassemble the coupling. Significant time, effort and expense would be saved if the technician could install a mechanical pipe coupling without first totally disassembling it and then reassembling it, piece by piece.

SUMMARY OF THE INVENTION

One aspect of the invention concerns interconnectable pipe coupling segments. Each segment is positionable straddling facing end portions of a pair of pipe elements for securing the pipe elements together in end-to-end relationship. The end portions of the pipe elements have an outer surface of substantially cylindrical profile. Each segment preferably comprises a pair of arcuate surfaces adapted to interface with the outer surfaces of the pipe elements. The arcuate surfaces are in spaced apart relation from one another and project inwardly toward the pipe elements. One of the arcuate surfaces has first and second notches positioned at opposite ends thereof. The notches provide clearance for inserting the pipe elements between the segments when the segments are interconnected with one another. The segments also have connection members for adjustably connecting one coupling segment to another. The connection members are adjustably tightenable for drawing the arcuate surfaces into engagement with the outer surfaces of the pipe elements.

Preferably, the notches are positioned adjacent to the connection members. In a preferred embodiment, both of the arcuate surfaces have first and second notches positioned at opposite ends thereof.

In another segment embodiment, the arcuate surfaces subtend an angle of less than 180°. In this embodiment, at least one of the arcuate surfaces on the segments has a first notch positioned at one end thereof. Furthermore, the other arcuate surface on the segment may have a second notch positioned at an end thereof, the first and second notches being positioned substantially adjacent to one another on the segment.

The invention also concerns a pipe coupling positionable straddling facing end portions of a pair of pipe elements for securing the pipe elements together in end-to-end relationship. The pipe coupling comprises first and second coupling segments interconnected with one another in spaced apart relationship. Each coupling segment has a pair of arcuate surfaces adapted to interface with the outer surfaces of the pipe elements. The arcuate surfaces are in spaced apart relation to one another and project inwardly toward the pipe elements. The arcuate surfaces have first and second notches positioned at opposite ends thereof. The notches provide clearance for inserting the pipe elements between the segments. Each coupling segment has connection members for adjustably connecting one coupling segment to another. The connection members are adjustably tightenable for drawing the arcuate surfaces into engagement with the outer surfaces of the pipe elements.

Preferably, each of the segments has first and second sidewalls positioned in spaced relation to one another. The sidewalls extend radially inwardly, and the arcuate surfaces are positioned on the sidewalls. The sidewalls define a channel positioned between the first and second arcuate surfaces.

There may also be a concavity positioned between the sidewalls. The coupling further comprises a flexible, resilient seal. The seal is preferably a substantially circular ring having an inner diameter sized to receive the pipe elements. The seal is positioned within the channels of the first and second coupling segments and has an outer diameter sized to position the first and second coupling segments in the desired spaced apart relation from one another thereby allowing the pipe elements to be inserted between the first and second coupling segments into the end-to-end relationship. The seal is deformable when the connection members are adjustably tightened to draw the arcuate surfaces into engagement with the outer surfaces of the pipe elements.

In another embodiment, the coupling again comprises first and second coupling segments interconnected with one another in spaced apart relationship. One of the coupling segments has a pair of arcuate surfaces adapted to interface with the outer surfaces of the pipe elements, the arcuate surfaces being in spaced apart relation to one another and projecting inwardly toward the pipe elements. The arcuate surfaces have first and second notches positioned at opposite ends thereof, the notches providing clearance for inserting the pipe elements between the segments. Furthermore, each of the coupling segments has connection members for adjustably connecting one coupling segment to another, the connection members being adjustably tightenable for drawing the arcuate surfaces into engagement with the outer surfaces of the pipe elements.

The invention also includes a pipe coupling comprised of a plurality of coupling segments. In this embodiment, at least one coupling segment subtends an angle less than 180°. Each coupling segment also has a pair of arcuate surfaces adapted to interface with the outer surfaces of the pipe elements. The arcuate surfaces project inwardly and are in spaced apart relation to one another. A first and a second of the coupling segments each have notches positioned at one end of their respective arcuate surfaces. The first and second segments are positioned with the notches substantially diametrically opposite to one another when the segments are interconnected to form the coupling. The notches provide clearance for inserting the pipe elements between the segments forming the coupling. Again, each coupling segment has connection members for adjustably connecting one coupling segment to another.

The invention further includes the method of securing facing end portions of pipe elements together in end-to-end relationship. The method comprises the steps of:
 (a) providing a pipe coupling having a plurality of coupling segments attached to one another end-to-end in spaced apart relation surrounding a central space, the coupling segments having arcuate surfaces adapted to interface with the outer surfaces of the pipes, the arcuate surfaces having notches therein positioned at opposite ends of the segments;
 (b) inserting the end portions of the pipe elements into the central space; and
 (c) drawing the coupling segments toward each other so as to engage the arcuate surfaces of the coupling segments with the outer surfaces of the pipe elements.

BRIEF DESCRIPTION OF THE DRAWINGS

FIG. 1 is a partial cross-sectional view of a coupling embodiment according to the invention;
FIG. 1A is an axial view of the coupling shown in FIG. 1;
FIG. 3 is a perspective view, partially cut away, of a seal used with couplings according to the invention;
FIG. 4 is a perspective view of a coupling embodiment according to the invention;
FIG. 5 in a side view of a coupling shown in FIG. 4;
FIG. 6 is an axial view of a coupling embodiment according to the invention;
FIG. 6A is a view of a portion of the coupling shown in FIG. 6;
FIGS. 9 and 10 are axial views of coupling embodiments according to the invention.

DETAILED DESCRIPTION OF THE EMBODIMENTS

Figure 2:
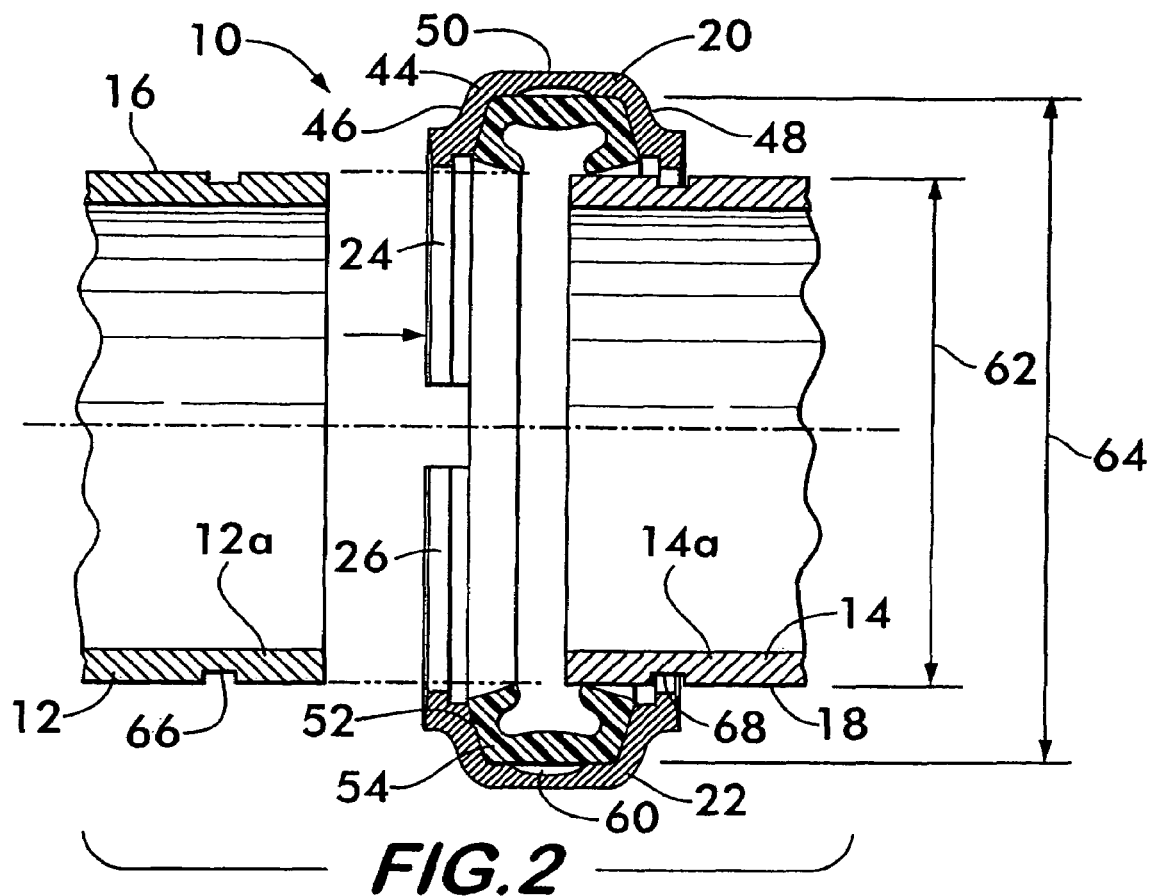
FIGS. 2-2C are longitudinal sectional views taken at line 2-2 of FIG. 1.

FIGS. 1 and 2 show a preferred embodiment of a pipe coupling 10 for joining pipe elements 12 and 14 in end-to-end relationship. Pipe elements 12 and 14 have respective outer surfaces 16 and 18 of substantially cylindrical profile. Coupling 10 comprises segments 20 and 22 positioned straddling facing respective end portions 12a and 14a of the pipe elements.

In the embodiment illustrated in FIGS. 1 and 2, each segment preferably has a pair of arcuate surfaces 24 and 26. The arcuate surfaces project inwardly toward the pipe elements and are engageable with the outer surfaces 16 and 18 of the pipe elements to form a joint as described in detail below. As best shown in FIG. 1, each arcuate surface has a pair of notches 28 and 30 positioned at opposite ends of the surfaces 24 and 26. The notches provide clearance between the segments 20 and 22 for inserting the pipe element end portions 12a and 14a between the segments during installation. Each notch preferably has a length between about 5% and about 30% of the total length of the arcuate surface with which it is associated.

Each segment has connection members 32, preferably in the form of lugs 34 attached to one another by fasteners 36 such as bolts 38 and nuts 40. The lugs have apertures 42 that receive the fasteners to effect attachment of the segments to one another in a preassembled configuration that facilitates installation of the coupling by obviating the need to disassemble it, as further explained below.

Figure 7:
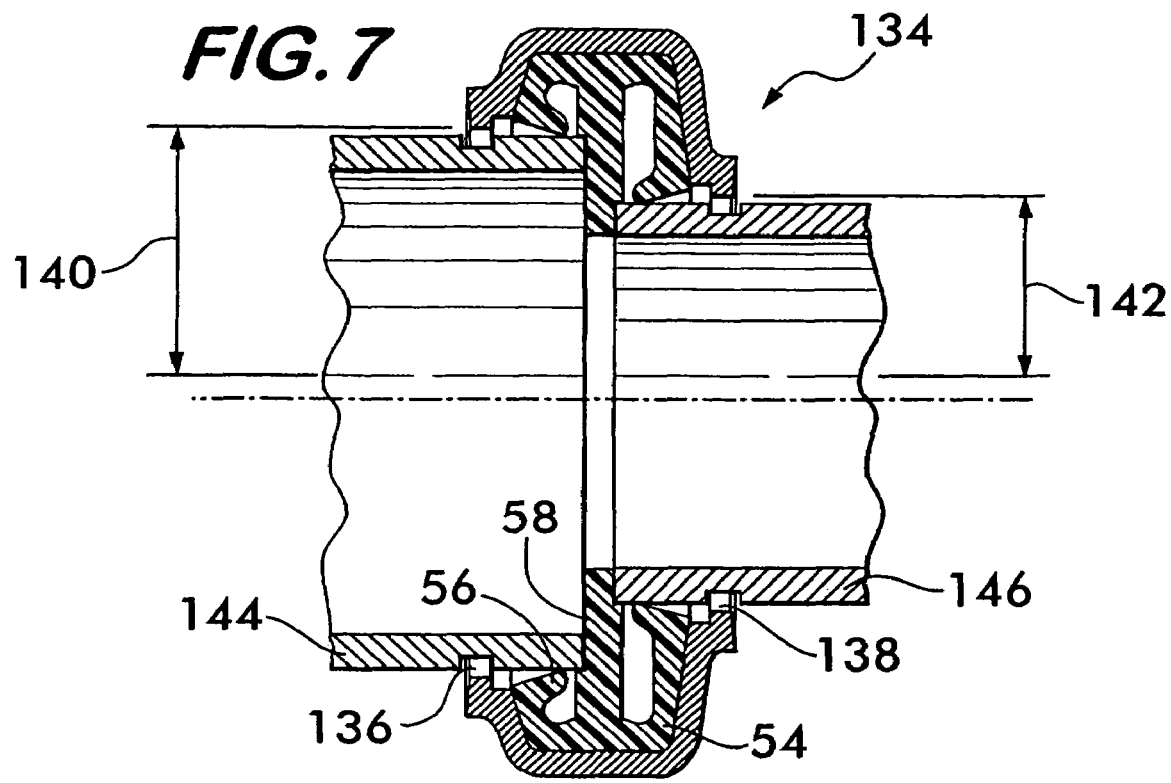
FIG. 7 is a longitudinal sectional view of a coupling embodiment according to the invention.

As shown in FIG. 2, each segment also includes a housing 44 formed by a pair of sidewalls 46 and 48, joined to a backwall 50. The sidewalls are in spaced apart relation, and together with the backwall 50, they define a channel 52 that receives a seal 54. Seal 54, an example of which is shown in FIG. 3, is a flexible, resilient ring preferably formed of elastomeric material. The seal may have lips 56 that use the internal pressure within the pipe elements to increase the sealing force between the seal and the outer surfaces 16 and 18 of the pipe elements. The seal may also have a tongue 58, as shown in FIG. 7. Tongue 58 projects radially inwardly and provides a stop surface that engages the ends of the pipe elements 12 and 14 to ensure proper positioning of the seal relatively to the pipe elements during installation. Engagement of the pipe elements with tongue 58 also effects alignment of the arcuate surfaces with the grooves (if present).

Because the seal 54 is substantially incompressible, it is advantageous to provide it with space into which it may expand when compressed. This space is provided by a concavity 60 positioned in the backwall 50 as shown in FIG. 2. Concavity 60 may take virtually any practical shape and allows for volume change of the seal when it is heated or exposed to fluids thereby distributing the deformation of the seal more evenly over its circumference and mitigating the tendency of the seal to extrude outwardly from between the segments between the lugs. The concavity also prevents tongue 58, if present, from being forced between the ends of the pipe elements.

As shown in FIG. 2, seal 54 has an inner diameter 62 sized to receive pipe elements 12 and 14, and an outer diameter 64 sized to maintain the segments in a predetermined spaced apart relationship (shown in FIG. 1) constituting the aforementioned preassembled state. In the preassembled state, the segments are spaced apart sufficiently to allow the pipe element end portions 12a and 14a to be inserted between the coupling segments into end-to-end relationship. Notches 28 and 30, shown in FIG. 1, provide clearance for the pipe elements. The availability of increased clearance at these locations allows the coupling segments 20 and 22 to be spaced closer to one another in the preassembled configuration than would be the case if the clearance was not available at the ends of the surfaces. This allows the use of bolts 38 having a shorter and more reasonable length than would otherwise be required. Shorter bolts provide the additional advantage of allowing the use of a socket wrench with standard sockets. Longer bolts may require deep sockets which are expensive and not always available. Furthermore, the use of shorter bolts give greater stability to the preassembled coupling and maintain the integrity of the coupling in the preassembled state, facilitating handling by keeping the segments substantially co-planar with one another. Additionally, when used with deformable couplings, the notches also reduce the amount of deformation required to conform the arcuate surfaces to the pipe element outer surface, thereby reducing the energy required to tighten the fasteners.

Figure 2A:
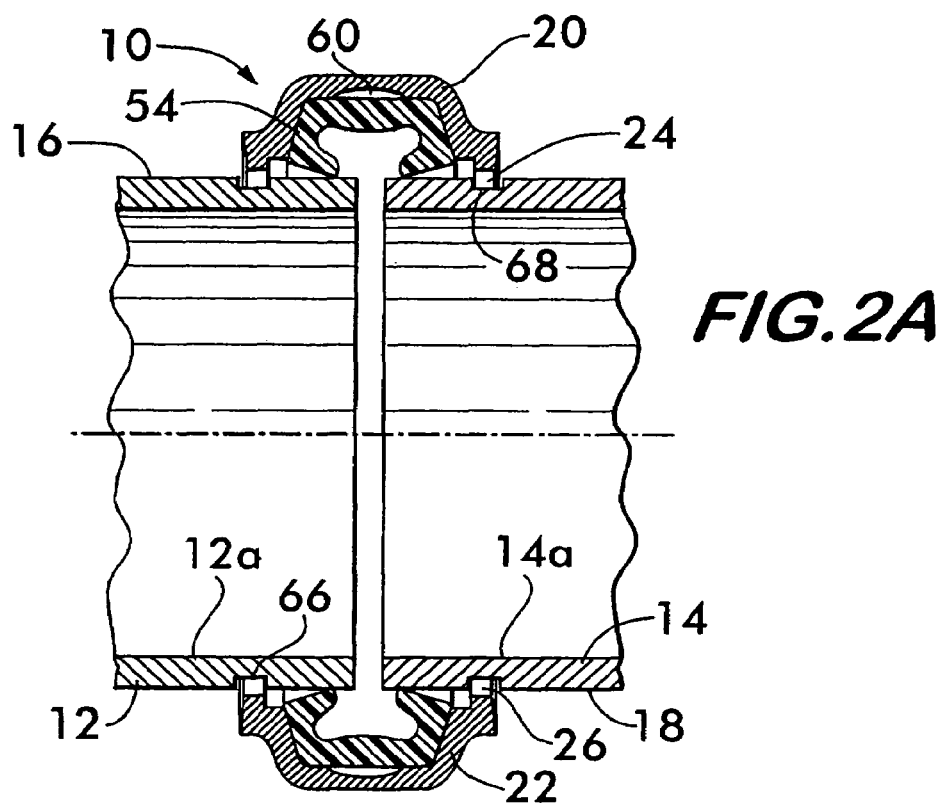

Installation of the coupling 10 is described with reference to FIGS. 1, 1A and 2-2B. As shown in FIG. 1, the coupling 10 is provided with segments 20 and 22 maintained in predetermined spaced apart relation by the seal 54. Fasteners 36 hold the segments together as a preassembled unit. As shown in FIGS. 2 and 2A, pipe elements 12 and 14 are inserted between the segments in end-to-end relationship, the notches 28 and 30 providing clearance at the points where the segments would otherwise interfere with the pipe elements for the predetermined spacing of the segments. Next, as shown in FIGS. 1A and 2B, the nuts 40 are adjustably tightened, the nuts and bolts 38 cooperating with the lugs 34 to draw the arcuate surfaces 24 and 26 into engagement with the outer surfaces 16 and 18 of the pipe elements 12 and 14. Seal 54 is deformed during this process. In this example, the outer surfaces 16 and 18 include circumferential grooves 66 and 68 which cooperate with the arcuate surfaces to provide mechanical restraint to the joint, keeping the pipe elements coupled under high internal pressures and external forces. The arcuate surfaces may also engage plain end pipe elements, pipe elements having shoulders, flared ends, as well as other configurations. For plain end pipes, the segments, as shown in FIG. 2C, may have arcuate surfaces 25 and 27 comprising inwardly projecting teeth 29. Teeth 29 engage outer surfaces of the pipe elements to provide mechanical restraint, and are especially advantageous when used with plain end pipe elements. Teeth 29 may be substantially continuous, or intermittent, these variations being shown. Single teeth, preferable for small couplings, are also feasible. The teeth may also be arranged in pairs on opposite sides of the segment to increase the mechanical restraint provided to the coupling.

As shown in FIGS. 1 and 1A, for the coupling 10, it is advantageous to hold nuts 40 in a position on bolts 38 that will maintain the segments 20 and 22 in the desired spaced apart relation as determined by contact between the segments and the seal 54. This is conveniently accomplished by deforming the threads 70 of bolts 38, preferably by staking. Staking the bolts hinders the rotation of the nuts and prevents them from unscrewing from the bolts under the effect of vibration, for example, during shipping, and keeps the coupling in the preassembled state with all of its parts together prior to installation. The staking is readily overcome when the nuts are tightened with a wrench.

Although the coupling segments are shown held in spaced apart relationship by the seal 54, it is also recognized that one or more spacers positioned between the coupling segments would also be effective at maintaining the segments' separation. Such spacers may be collapsible tubes, removable bodies or elastic spring elements and are preferably positioned between the lugs in facing relation. These spacers are the subject of a co-pending application for patent.

Another coupling embodiment 72 is shown in FIG. 4. Coupling 72 is comprised of two segments 74 and 76 from which lugs 78 and 80 extend, the lugs cooperating with fasteners 82 to act as connection members for adjustably connecting one coupling segment to another. As described above, each segment has a pair of arcuate surfaces 84, 86, each preferably projecting radially inwardly from the segments. Notches 88 and 90 are positioned at the ends of the arcuate surfaces 84 and 86, preferably substantially adjacent to the lugs 78 and 80. Anti-rotation teeth 92 may also be positioned adjacent to the arcuate surfaces and project radially inwardly to engage the outer surface of the pipe elements and thereby increase torsional rigidity.

As best shown in FIG. 5, each segment 74 and 76 has a pair of angularly oriented surface portions 94 and 96 located adjacent to each of the lugs 78 and 80. As illustrated, the slope of surface portion 94 may be opposite to the slope of surface portion 96 on each segment. (Both surfaces could also be sloped in the same direction as well.) This opposite slope relationship between the surfaces on a segment results in surfaces having compatible slopes being positioned in facing relation in a pre-assembled coupling. When the fasteners 82 are tightened, engaging the arcuate surfaces to the outer surfaces of the pipe elements, the angular surface portions 94 and 96 on each segment engage and slide relatively to one another, causing the segments to draw together and rotate relatively to one another in opposite directions about an axis 98 oriented substantially perpendicularly to the axis of the pipe elements being joined. These motions of the segments 74 and 76 cause the arcuate surfaces 84 and 86 to engage grooves in the pipe elements if present and adds rigidity about all axes of the joint. For coupling segments having surface portions with the same slopes, the couplings move along the pipe in opposite directions relatively to one another with similar effect.

Couplings according to the invention comprised of only two segments are preferred for joining pipe elements up to a certain size. However, above that size, the manufacturing costs associated with large segments become excessive and it is economically advantageous to use couplings 100, as shown in FIG. 6, having more than two segments. Segments 102 subtend an angle 104 less than 180° and have connection members 106, again preferably in the form of lugs 108 with apertures 110 adapted to receive fasteners 112. Coupling 100 having four segments 102 is shown by way of example, it being understood that couplings having more or fewer segments are feasible.

As shown in FIG. 6A, each segment has arcuate surfaces 114 engageable with the outer surfaces of pipe elements to be joined. The fasteners 112 are adjustably tightenable and cooperate with the lugs to draw the segments 102 toward one another and into engagement with the pipe elements. Segments 102 may be made with only one notch 116 at an end of one arcuate surface, but, as shown in FIGS. 6 and 6A, it is preferred that both arcuate surfaces have notches at opposite ends, the notches providing clearance as described previously.

Figure 8:
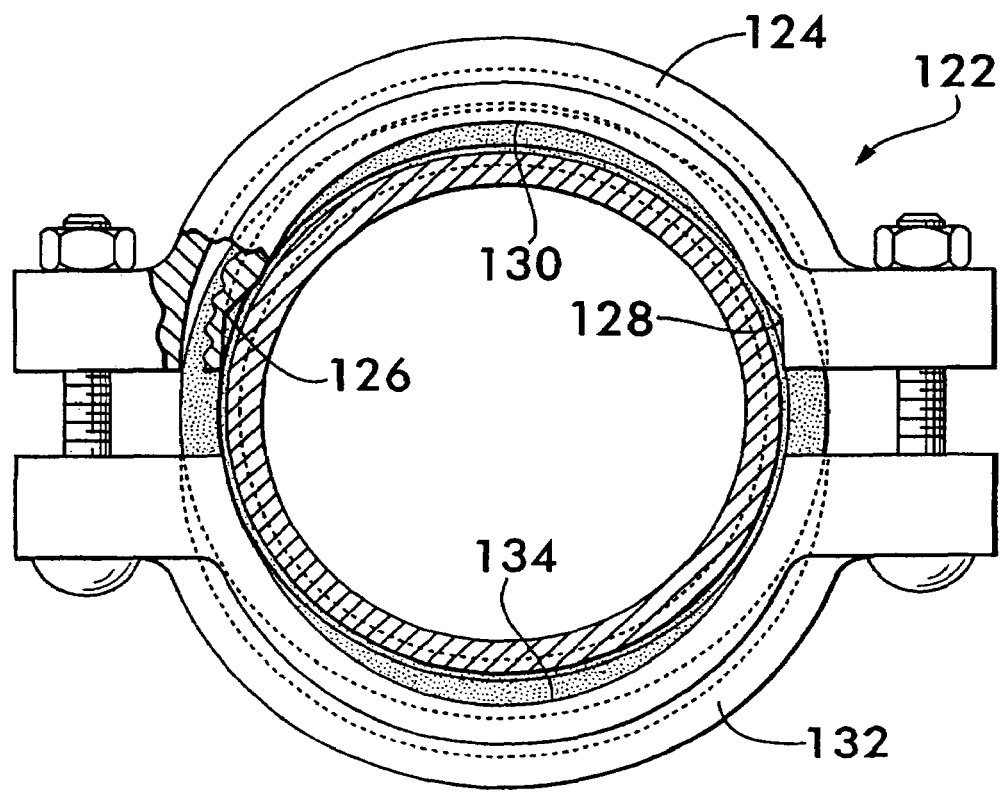
FIG. 8 is a partial cross-sectional view of a coupling embodiment according to the invention.

While a preferred embodiment of the coupling includes pairs of arcuate surfaces on the segments having pairs of notches at either end, it is also feasible to use segments having fewer arcuate surfaces and/or fewer notches on the arcuate surfaces. One such example is shown in FIG. 8, wherein coupling 122 comprises a segment 124 having notches 126 and 128 at either end of its arcuate surfaces 130, segment 124 being attached in spaced relation to a segment 132 having arcuate surfaces 134 but no notches. The notches 126 and 128 still provide effective clearance for insertion of pipe elements but the absence of notches on segment 132 means that the segments must be separated in the preassembled state by a larger distance than if notches were positioned on both segments comprising the coupling.

Another coupling using fewer notches is shown in FIG. 9. Coupling 131 has segments 133 and 135, each segment having pairs of arcuate surfaces 137 in spaced relation as described above. However, each arcuate surface has only one notch 139 positioned at one end of the surface, the notches on each segment also being adjacent to one another. When preassembled, the segments 133 and 135 are arranged so that the notches on one segment are substantially diametrically opposite to the notches on the other segment. As shown in FIG. 9, the notches provide clearance for insertion of the pipe element, insertion being facilitated by shifting the segments laterally relatively to one another as indicated by arrows 141.

Couplings having segments with notches such as those thus far described may be adapted to various configurations, one of which is shown in FIG. 7. Coupling 134 has arcuate surfaces 136 and 138 having different radii of curvature from one another, the radius of curvature 140 for arcuate surface 136 being greater than the radius 142 for arcuate surface 138. This configuration permits the coupling 134 to join pipe elements 144 and 146 together in end-to-end relationship, the pipe elements having different diameters from one another.

FIG. 10 shows a notched coupling 148 according to the invention that serves as an adapter between flanged and non-flanged pipe elements. Coupling 148 comprises segments 150 and 152. Each segment has one arcuate surface 154 with notches 156 at opposite ends. A flange 158 is positioned on each segment 150 and 152 in spaced relation to the arcuate surface 154, the flange 158 extending circumferentially and radially outwardly allowing the coupling to join grooved, plain end or other non-flanged pipe elements to flanged pipe elements. As with the previously described embodiments, coupling 148 is provided preassembled with the segments 150 and 152 in spaced relation, allowing the non-flanged pipe element to be inserted between the segments on the side having the arcuate surfaces 154. The segments are attached to one another by fasteners 160 that cooperate with lugs 162 and 164 so that when tightened, the arcuate surfaces 154 engage the outer surface of the pipe element. Tightening the fasteners also brings the flanges 158 into alignment with the mating flange on the flanged pipe element, allowing bolts (not shown) to be used to effect the attachment to the flanged pipe element.

Notched mechanical pipe couplings according to the invention provide for rapid and sure installation, creating a pipe joint while avoiding the need to totally or partially disassemble and then reassemble the coupling and handle the individual piece parts.

What is claimed is:

1. A method of securing facing end portions of pipe elements together in end-to-end relationship, wherein said end portions of said pipe elements have an outer surface of substantially cylindrical profile, a circumferential groove being positioned in at least one of said end portions of at least one of said pipe elements, said method comprising the steps of:
   (a) first, providing a pipe coupling having a plurality of coupling segments, each said segment having a pair of ends oppositely disposed, each said end on each said segment being attached to another of said ends of another of said segments, said segments being attached to one another in spaced apart relation surrounding a central space, said coupling segments having at least one arcuate surfaces adapted to be received within said circumferential groove in said at least one pipe elements, said at least one arcuate surfaces having notches therein positioned at opposite ends of said at least one arcuate surface;
   (b) second, supporting said coupling segments in said spaced apart relation on a flexible resilient seal positioned within said central space, said seal having an inner diameter sized to receive said pipe elements and an outer diameter sized to support said coupling segments in said spaced apart relationship sufficient to permit axial insertion of said end portions of said pipe elements into said central space;
   (c) third, inserting said end portions of said pipe elements axially into said central space while all of said coupling segments are attached to one another in said spaced apart relationship, said end portions passing through said notches; and
   (d) fourth, drawing said coupling segments toward each other so as to engage said at least one arcuate surface of said coupling segments within said one circumferential groove in said at least one end portion of said pipe elements.

2. A method of securing facing end portions of pipe elements together in end-to-end relationship using a pipe coupling having a plurality of coupling segments, each said segment having a pair of ends oppositely disposed, each said end on each said segment being attached to another of said ends of another of said segments, said segments being attached to one another in spaced apart relation surrounding a central space, a flexible resilient seal being positioned within said central space, said coupling segments having arcuate surfaces adapted to be received within circumferential grooves positioned within said end portions of said pipe elements, said arcuate surfaces having notches therein positioned at opposite ends of said arcuate surfaces, said method comprising:
   (a) first, supporting said coupling segments in said spaced apart relation on said flexible resilient seal positioned within said central space, said seal having an inner diameter sized to receive said pipe elements and an outer diameter sized to support said coupling segments in said spaced apart relationship sufficient to permit axial insertion of said end portions into said central space;
   (b) second, inserting said end portions of said pipe elements axially into said central space while all of said coupling segments are attached to one another in said spaced apart relationship, said end portions passing through said notches; and
   (c) third, drawing said coupling segments toward each other so as to engage said arcuate surfaces of said coupling segments within said grooves of said pipe elements.

* * * * *